No. 12,445. REISSUED FEB. 6, 1906.

E. O. ENGBERG.

MACHINE FOR TRIMMING AND APPLYING SHADE GOODS.

APPLICATION FILED JULY 22, 1905.

3 SHEETS—SHEET 1.

Witnesses
A. Clements
A. Weldon

Inventor
Ephraim O. Engberg.
By his Attorney J. A. E. Conwell

No. 12,445. REISSUED FEB. 6, 1906.

E. O. ENGBERG.

MACHINE FOR TRIMMING AND APPLYING SHADE GOODS.

APPLICATION FILED JULY 22, 1905.

3 SHEETS—SHEET 2.

Witnesses
A. Clements
A. Weldon

Inventor
Ephraim O. Engberg
By his Attorney
J. A. E. Criswell

No. 12,445. REISSUED FEB. 6, 1906.

E. O. ENGBERG.

MACHINE FOR TRIMMING AND APPLYING SHADE GOODS.

APPLICATION FILED JULY 22, 1905.

3 SHEETS—SHEET 3.

Witnesses
A. Clements
A. Weldon

Inventor
Ephraim O. Engberg
By his Attorney J. A. E. Crimwell

UNITED STATES PATENT OFFICE.

EPHRAIM O. ENGBERG, OF SALT LAKE CITY, UTAH, ASSIGNOR TO JOHN BEECHER PATTON, OF KENT, OHIO.

MACHINE FOR TRIMMING AND APPLYING SHADE GOODS.

No. 12,445. Specification of Reissued Letters Patent. Reissued Feb. 6, 1906.

Original No. 754,759, dated March 15, 1904. Application for reissue filed July 22 1905. Serial No. 270,876.

*To all whom it may concern:*

Be it known that I, EPHRAIM O. ENGBERG, a citizen of the United States, and a resident of Salt Lake City, in the county of Salt Lake and State of Utah, have invented a new and Improved Machine for Trimming and Applying Shade Goods, of which the following is a full, clear, and exact description.

This invention relates to a machine by which the fabric used for window-shades may be conveniently and accurately slit at its edges to produce the proper width and severed into the necessary lengths, the machine simultaneously creasing the stock, so as to facilitate the application to the lower edge thereof of the usual slat, and the machine, further, having means for carrying the shade-roller and for rotating the same during the operation of the machine, whereby automatically to wind the shade on the roller.

This specification is an exact description of one example of my invention, while the claims define the actual scope thereof.

Reference is to be had to the accompanying drawings, forming a part of this specification, in which similar characters of reference indicate corresponding parts in all the views.

Figure 1:
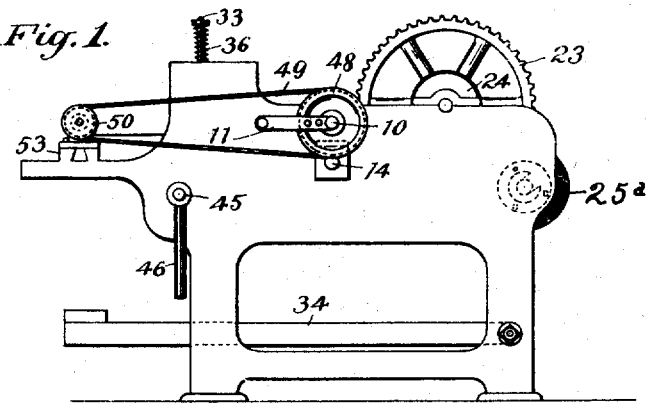
Figure 2:
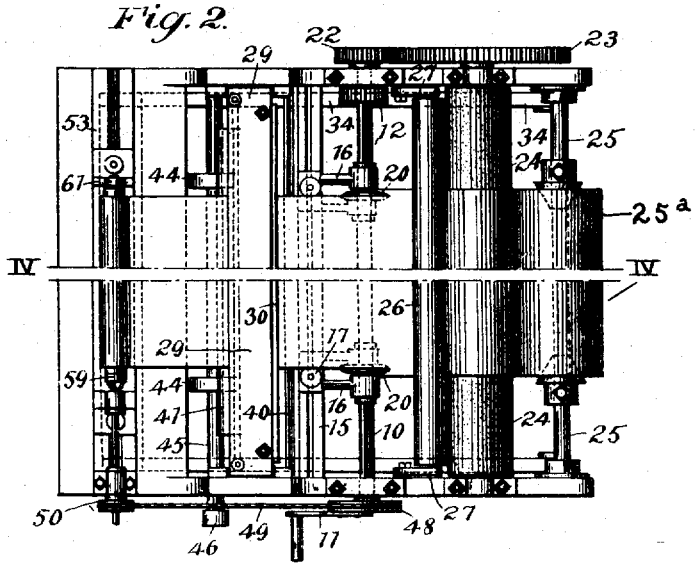
Figure 3:
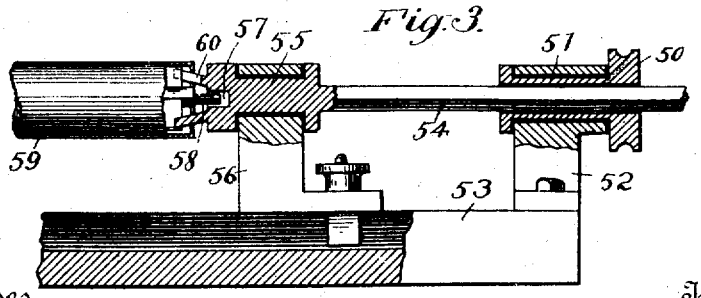
Figure 4:
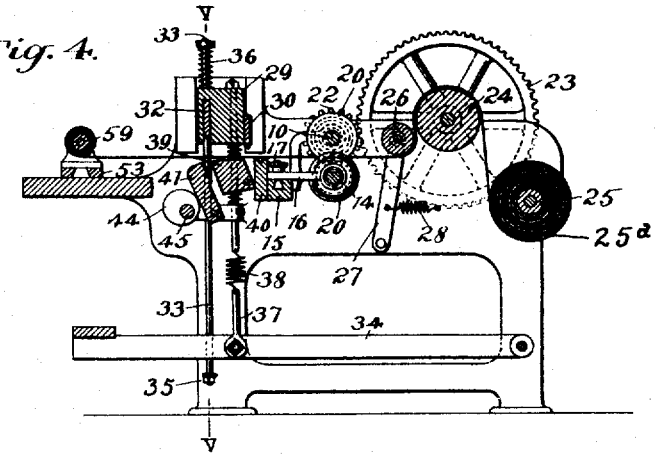
Figure 5:
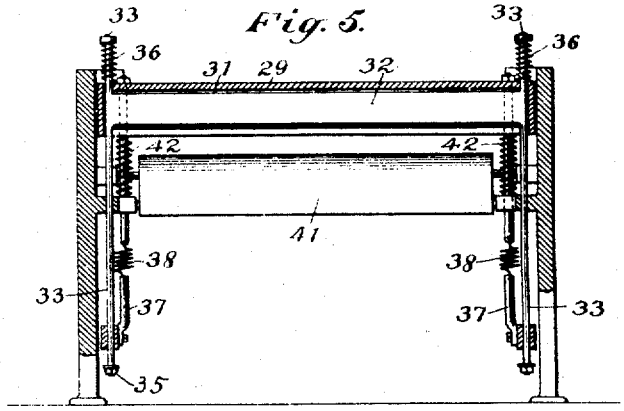
Figure 6:
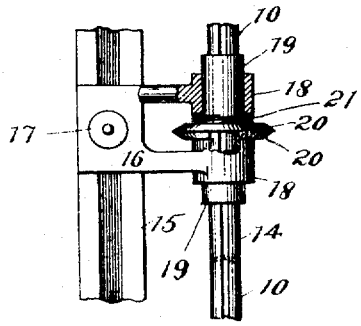
Figure 7:
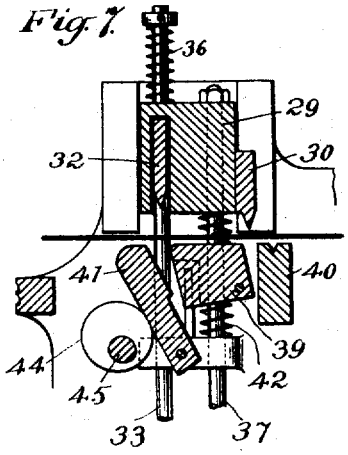
Figure 8:
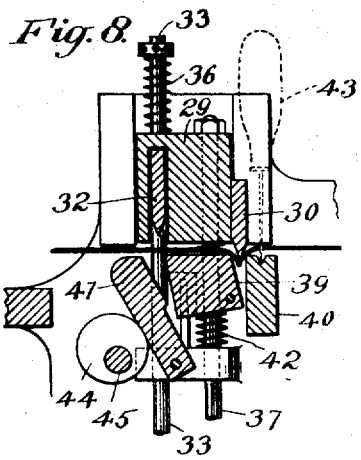
Figure 9:
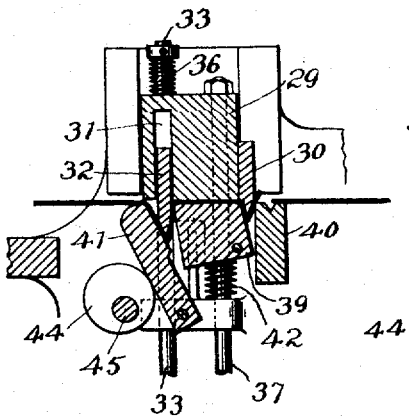
Figure 10:
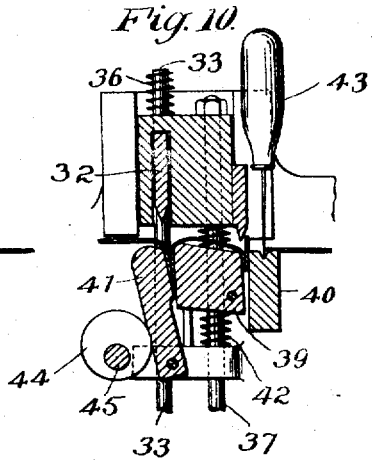
Figure 11:
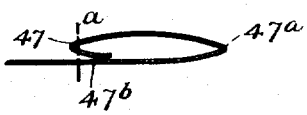

Figure 1 is a side elevation of the invention. Fig. 2 is a plan view thereof. Fig. 3 is a sectional detail showing the device for mounting the shade-roller in the machine. Fig. 4 is a longitudinal section on the line IV IV of Fig. 2. Fig. 5 is a cross-section on the line V V of Fig. 4. Fig. 6 is an enlarged plan view, partly in section, of a pair of slitting-knives. Figs. 7 and 8 are enlarged sectional views of the creasing devices. Fig. 9 is a view similar to Figs. 7 and 8 with the creasing devices in a different position. Fig. 10 is a detail view showing the transverse cutting device in full lines and the parts in creasing position. Fig. 11 is a view of the folded end or loop of the stock or shade material.

The machine should be provided with a suitable framing, the details of which will not be described.

10 indicates the primary-movement shaft, which is provided with any suitable means for driving it. According to the organism of the hand-machine here illustrated said shaft is provided with a crank 11. This shaft is mounted transversely in the frame and is connected by gears 12 with a shaft 14, which runs parallel therewith immediately below it. A transverse guide 15 is mounted in the frame, and said guide carries two brackets 16, which are adjustable on the guide by means of screws 17 or the like. Each bracket 16 has two arms, one projecting to the plane of the shaft 10 and the other arm to the plane of the shaft 14 and each being provided with sleeves 18, in which are fitted to turn the hubs 19 of rotary knives 20, said hubs having feathers or keys thereon which run in corresponding keyways in the shafts 10 and 14, as best shown in Fig. 6. 21 indicates springs bearing between the collars 18 and knives 20 and serving to press said knives into engagement with each other, the knives overlapping, so that the goods or material when drawn between them in the manner illustrated in Figs. 2 and 4 will be trimmed. The rotation of the shafts 10 and 14 imparts a corresponding movement to the knives. By adjusting the brackets 16 on the guide 15 the machine may be accommodated to any width of stock. The said primary-movement shaft 10 carries a pinion 22, and said pinion is in mesh with a gear 23 in connection with a roller 24, extending transversely in the frame. Over this roller the stock is passed from the rod 25, on which said stock is wound, the roll of material 25[a] being loosely mounted between suitable centers held on the rod 25, as best shown in Figs. 2 and 4.

26 indicates a friction-roll which is mounted in swinging arms 27, and said arms are under the tension of springs 28, thus moving the roll 26 to hold the stock or material between said roll and the roll 24, thereby forming a tension and feeding device and giving the roll 24 sufficient hold on the stock to enable it to be drawn from the roll 25 and to feed the material to the edge-trimming knives. Said roll 26 also serves to bring the stock down into the plane of the meeting edges of the knives 20.

In suitable vertically-disposed guides on the frame is mounted to move vertically a horizontal cross-head 29, this cross-head carrying fixedly a creasing-blade 30 and having a longitudinal cavity 31 therein, in which is loosely arranged a second creasing-blade 32. As best shown in Fig. 5, the blade 32 is connected at its ends with downwardly-extending rods 33, passing loosely through a treadle 34 and having nuts 35 or other stops at their lower extremities. Springs 36 are arranged to act between the blade 32 and the cross-head 29 and serve to hold said blade yieldingly in the position shown in Fig. 7. The cross-head is connected at each end to a downwardly-extending rod 37, in which rods springs 38 are interposed, these springs being either fastened to or formed integral with the rods and said rods being securely connected at their ends with the aforesaid treadle 34. The rods 33 and 37 pass loosely through guide-lugs on the frame, as shown best in Figs. 4, 5, and 7, and immediately above these guide-lugs is arranged a rocking creaser-bar 39. At one side of said bar is a rigid strip 40, carried by the frame and extending transversely thereof, and at the other side of the creaser-bar 39 is a wall 41, which is mounted on the frame to swing toward and from the bar 39. Between the bar 39 and the said lug of the frame an expansive spring 42 is arranged, this spring tending to throw up the cross-head 29. The normal position of the parts therefore is then as shown in Figs. 1, 4, 5, and 7, and when the treadle 34 is depressed the parts 29 and 32 move down bodily until the blade 30 enters between the strip or bar 40 and the creaser-bar or rocking member 39, as shown in Fig. 8. In this position the material may be cut transversely, and for this purpose the strip or bar 40 is preferably provided with a longitudinal groove in its upper edge, and said groove is intended to guide a hand cutting-tool 43, (indicated in full lines in Fig. 10 and by broken lines in Fig. 8.) this tool being run over the web or strip 40 to sever the material when the parts assume the position shown in Fig. 8. The cross-head or member 29 and blades 30 and 32 continue to move down by the action of the treadle 34 until the said head is arrested by the bar or member 39, thereby clamping the material between said members. Then the movement of the cross-head ceases, the springs 38 give, and as the treadle 34 strikes the nuts 35 the blade 32 moves down independently of the cross-head and enters between the creaser-bar 39 and the wall or member 41, both of the blades 30 and 32 forming a fold and crease in the stock or material, one of said folds being deeper than the other, as indicated in Fig. 9. By adjusting the nuts 35 on the ends of the rods 33 the stroke of the blade 32 may be varied, and thereby the length of the loop or hem to adapt it for different sizes of slats according to the size of shade to be made. Cams 44 are mounted on a rocking shaft 45 and arranged to bear against the swinging wall 41. Said shaft 45, as best shown in Fig. 1, is provided outside the frame with a handle 46, which permits the manual rocking of the shaft. The cams 44 are normally in the position shown in Figs. 7 and 8, and when the parts assume the position shown in Fig. 9 and as soon as the treadle is released the shaft 45 should be rocked to throw the cams 44 against the swinging wall 41 and rock said wall toward the creaser-bar 39, thus imparting a like rocking movement to said bar and bringing all the other of the parts or members 39, 40, and 41 up snugly together, thereby finishing the creases, as shown in Fig. 10, the formation of which was started by the above-described action of the blades 30 and 32. The cams are then released, and the creasing members return to their normal position. As soon as the fabric or material is released it folds over of itself at the two creases or bends indicated by 47 and $47^a$, owing to the stiffness of said material and the creased portions, and provides a loop or socket for the usual shade-slat, the fold being such that the short end $47^b$ will lie next the main body and within the loop.

On the drive-shaft 10 is a pulley 48, and over this pulley runs a belt 49, said belt also passing over a pulley 50, formed on or fastened to a sleeve 51, arranged to turn freely in a bearing 52, mounted on the end of a transverse guide 53, itself suitably fastened to the frame. (See Fig. 3.) Said sleeve 51 has an angular interior, in which fits a correspondingly angular shaft 54, this shaft sliding in the sleeve, but turning therewith and having at its inner end a head 55, turning loosely in a bearing 56, adjustable longitudinally on the aforesaid guide 53. Said head 55 is provided with a central orifice 57, receiving the journal 58 of a shade-roller 59, which roller forms no part of my invention, but may be any of the well-known commercial shade-rollers. The head 55 is also provided with one or more prongs 60, which engage with the roller to impart rotary movement thereto. The opposite end of the shade-roller, as shown best in Fig. 2, is mounted in a suitable bearing 61, adjustably held in the guide 53. By this mechanism the bearings 56 and 61 may be adjusted toward and from each other to seat any length of shade-roller which it is desired to employ, and by means of the belt 49 and its pulleys 48 and 50 the said shade-roller will be rotated in time with the other machine-controlled movements of the apparatus.

In using the invention the stock is wound on the roller 25 and then led through the machine, as shown in Fig. 4. The leading edge of the stock should then be fastened to the shade-roller in the usual manner and the rotating parts of the machine started, thus simultaneously trimming off the stock to the desired width and winding the same on the shade-roller. When the necessary amount of stock has been wound on the roller, the treadle 34 should be depressed, thus throwing the creaser-blades into the position shown in Fig. 8. The before-referred-to hand-tool 43 should now be manipulated to cut off the stock. The cross-head or part 29 and folding-blades 30 and 32 have a further movement by the action of the treadle 34 and clamp the material between the members 29 and 39, as shown in Fig. 9. This stops the downward movement of the cross-head 29, and on further movement of the treadle the springs 38 yield and the blade 32 moves downward independently of the cross-head and enters between the creaser-bar 39 and wall or member 41, as already explained. The treadle is now released and the cams 44 operated to throw the wall 41 up and finish the creasing operation, as shown in Fig. 10. The cams are now released and the creasing devices allowed to return to their inactive position. This releases the stock or material, and the material bends and forms the loop or socket for the shade-slat, as shown in Fig. 11, after which it is stitched along the broken line, (indicated at *a* in Fig. 11,) and the usual slat should then be slipped through the socket thus formed. This finishes the operation on one curtain or shade, and the second operation is begun by placing a new roller in the machine and leading the severed edge of the stock forward into engagement with the roller, as before described.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. In a machine for making window-shades, the combination with means for holding a web of shade material, of shade-roller-holding means, means for rotating the shade-roller-holding means to wind the material on the roller, means for trimming the edges of the material lengthwise thereof, means for cutting the material transversely, together with mechanism for creasing the material transversely thereof for forming the loop for the shade-slat and arranged in advance of the trimming means.

2. In a machine for making window-shades, the combination with means for holding a web of shade material, of shade-roller-holding means, means for rotating the shade-roller-holding means, a feeding device for the material forcing the same toward the shade-roller-holding means, knives for cutting the material lengthwise thereof, means for cutting the material transversely, together with devices for creasing the material transversely thereof for forming a loop for the shade-slat.

3. In a machine for making window-shades, the combination with means for holding a roll of shade material, of shade-roller-holding means, means for rotating the shade-roller-holding means, knives for cutting the material lengthwise thereof, feed-rolls located between the roll of material-holding means and said knives, means for cutting the material transversely, together with movable folding-blades creasing the material at distinct points for forming the shade-slat loop.

4. In a machine for making window-shades, the combination with means for holding a web of shade material, of shade-roller-holding means adapted to removably hold a shade-roller, feed-rolls for forcing the material toward the shade-roller-holding means, together with mechanism for creasing the material transversely thereof for forming a loop for the shade-slat.

5. In a machine for making window-shades, the combination with means for holding shade material, of shade-roller-holding means, means for rotating the shade-roller-holding means, knives for cutting the material lengthwise, folding means acting on the material and folding the same for the shade-slat, and a feeding device for forcing the material toward the folding means.

6. In a machine for making window-shades, the combination with means for holding a web of shade material, of means for supporting a shade-roller to wind the material thereon, creasing devices for creasing the material transversely thereof at two distinct points for the shade-slat hem or loop, and means whereby the distance between the folds may be increased or diminished to make different sizes of loops for different sizes of shade-slats.

7. In a machine for making window-shades, the combination with means for holding shade material, of movable folding-blades forming distinct folds in the material to make the shade-slat loop or hem, and means whereby the distance between the folds may be increased or diminished to make different sizes of loops for different sizes of shade-slats.

8. In a machine for making window-shades, the combination with a frame and means for holding shade material, of means for winding the material on a shade-roller, trimming devices for trimming the edges of the material, mechanism for folding and creasing the material transversely thereof to form the loop for the shade-slat having two bends and an inturned end, together with means by which the material may be cut transversely.

9. In a machine for making window-shades, the combination with means for holding a web of shade material, of shade-roller-holding means adapted to removably hold a shade-roller, means for rotating the shade-roller-holding means for winding the material on the roller, together with mechanism for folding and creasing the material transversely thereof for forming a loop for the shade-slat.

10. In a machine of the character described, the combination with means for holding shade material, of means for rotating a shade-roller to wind the material thereon, together with folding means acting on the material and forming the loop for the shade-slat.

11. In a machine of the character described, the combination with means for holding a web of shade material, of folding and creasing devices adapted to fold and crease the material for forming the loop for the shade-slat, means for cutting the material lengthwise thereof, tension devices, together with means for cutting the material transversely thereof after the material has been creased.

12. In a machine of the character described, the combination with means for holding shade material, of two movable folding devices and independent creasing means having movable members for folding and creasing the material transversely thereof and forming the loop for the shade-slat, tension devices for the material, together with means for cutting the material transversely thereof.

13. In a machine of the character described, the combination with means for holding a web of shade material, means for removably holding a shade-roller, means for rotating the shade-roller-holding means to wind the material on the roller, together with mechanism for acting on the material transversely thereof and forming a loop having two bends adapted to hold the shade-slat.

14. In a machine for making window-shades, the combination with means for holding a web of shade material, of means for rotating a shade-roller to wind the material thereon, and creasing means for creasing the material transversely thereof and forming a loop having two bends and an inturned end extending within the loop.

15. In a machine for making window-shades, the combination with a frame and means for holding shade material, of means for operating on a shade-roller to wind the material thereon, means for cutting the material transversely, together with means for forming a shade-slat loop or socket at the point where the material is cut transversely.

16. In a machine of the character described, the combination with a frame, of means for holding shade material on the frame, means for rotating a shade-roller for winding the material thereon, together with means having movable members clamping the material between them and forming a shade-slat loop or socket in which one end is bent inward within the loop.

17. In a machine for making window-shades, the combination with means for holding shade material, of means for cutting the material transversely, together with two movable folding devices, and independent movable creasing devices acting on the material after it is folded means adjacent to the transverse cutting means for forming a shade-slat loop or socket having two bends with an inturned end adapted to lie close to the body of the material and within the loop.

18. In a machine for making window-shades, the combination with means for holding shade material, of independent folding devices, and independent movable creasing devices acting on the material after it has been folded for forming a shade-slat loop or socket in the material having two bends with an inturned end extending within the loop.

19. In a machine for making window-shades, the combination with a frame, of means for holding shade material on the frame, feeding means for the material, knives for slitting the material lengthwise thereof, means for cutting the material transversely, together with folding and creasing means comprising two independently-movable folding-blades, one working in advance of the other, and independent creasing means having movable members acting on the material to finish the creases after the blades have folded the same.

20. In a machine for making window-shades, the combination with a frame, of means for holding a roll of shade material on the frame, feeding means for the material, means for rotating a shade-roller for winding the material thereon, means for cutting the material transversely, together with folding and creasing means comprising independently-movable folding-blades, and independent creasing means having movable members acting on the material to finish the creases after the blades have folded the same.

21. In a machine for making window-shades, the combination with a frame, of means for holding a roll of shade material on the frame, means for feeding the material, means for rotating a shade-roller for winding the material thereon, knives for slitting the material lengthwise thereof, means for cutting the material transversely, together with mechanism for folding and creasing the material at two distinct points for forming the shade-slat loop.

22. In a machine for making window-shades, the combination with a frame, of means for holding a roll of shade material on the frame, means for feeding the material, means for rotating a shade-roller for winding the material thereon, knives for slitting the material lengthwise thereof, means for cutting the material transversely, folding and creasing means comprising two independently-movable folding-blades, one working in advance and at a distinct point from the other, and independent creasing means having movable members acting on the material to finish the creases after the blades have folded the same, together with means for moving the creasing devices and blades independently of each other.

23. In a machine for making window-shades, the combination with means for holding shade material, of a device for trimming the material lengthwise thereof, together with mechanism for forming a shade-slat loop or socket having two bends with an inturned end extending within the loop, and a movable knife adapted to cut the material transversely.

24. In a machine for making window-shades, the combination with means for holding shade material, of means for winding the material on a shade-roller, means for trimming the material lengthwise thereof, a knife movable transversely of the machine to cut the material transversely, together with mechanism for forming a shade-slat loop or socket having two bends with an inturned end extending within the loop.

25. In a machine for making window-shades, the combination with means for holding shade material, of means for forming a shade-slat loop or socket, means for cutting the material transversely, together with a tension device comprising two rotatable rollers one of which is yieldingly forced toward the other.

26. In a machine for making window-shades, the combination with a frame and means for holding a web of shade material on the frame, of creasing devices having movable members, together with two folding devices adapted to move simultaneously one in advance of the other and coacting with said creasing devices for forming a loop for the shade-slat.

27. In a machine of the character described, the combination with a frame and means for holding shade material on the frame, of creasing devices having movable members, together with two folding devices adapted to move simultaneously one in advance of the other and coacting with said creasing devices to form two distinct folds and forming a loop for the shade-slat having an inturned end extending within the said loop.

28. In a machine of the character described, the combination with a frame, means for holding a web of shade material thereon, of creasing means having a fixed member and two movable members, means for moving the goods into the space between said members, together with independent movable means for operating the movable members of the creasing means and forming a loop having two bends with a short end extending within said loop.

29. In a machine of the character described, the combination with a frame, of means for folding and creasing shade material transversely thereof and forming a loop for the shade-slat, comprising creasing means having movable and fixed members and two folding devices for forcing the goods between the creasing means, the said folding devices operating one in advance of the other on the material at two distinct points to form separate folds.

30. In a machine for making window-shades, the combination with means for holding shade material, of two folding-blades, and means for giving one blade a longer movement than the other.

31. In a machine for making window-shades, the combination with means for holding shade material of two reciprocatory folding-blades, creasing devices for finishing the folds made by the blades, and means for moving the blades to form one fold deeper than the other.

32. In a machine for making window-shades, the combination with means for holding shade material, of two folding-blades forming two distinct folds in the material, and means for moving one blade to form a deeper fold than the other.

33. In a machine for making window-shades, the combination with means for holding shade material, of devices forming two folds of different depths in the material.

34. In a machine for making window-shades, the combination with means for holding shade material of devices forming two distinct folds in the material, and independent movable devices for clamping the folds to finish the creasing.

35. In a machine for making window-shades, the combination with means for holding shade material, of creasing devices, a cross-head movable toward and from the same, a folding-blade independent of the head, a second blade movable with the head, and means for imparting a longer movement to one blade than the other.

36. In a machine for making window-shades, the combination with means for holding shade material, of two reciprocatory folding-blades yieldingly held together and acting on the material at two distinct points, one of said blades forming a deeper fold in the material than the other.

37. In a machine for making window-shades, the combination with means for holding shade material, of a cross-head, a folding-blade carried directly by the cross-head, a second folding-blade yieldingly held to said cross-head, and means for giving a greater movement to the yieldingly-held blade than to the cross-head.

38. In a machine for making window-shades, the combination with means for holding shade material, of creasing devices having movable members, a cross-head movable toward the same, a blade carried directly by the cross-head, a second blade yieldingly held to the cross-head and normally movable therewith, together with mechanism for imparting a greater movement to the yieldingly-held blade than to the cross-head.

39. In a machine for making window-shades, the combination with means for holding shade material, of creasing devices having movable members, two folding devices adapted to move simultaneously one in advance of the other and coacting with said creasing devices for forming a loop for the shade-slat, together with means for causing one folding device to form a deeper fold than the other.

40. In a machine for making window-shades, the combination with means for holding shade material, of two folding-blades acting on the material at two distinct points, together with creasing devices having movable members coacting with the blades for forming the shade-slat loop.

41. In a machine for making window-shades, the combination with means for holding shade material, of reciprocatory folding-blades acting on the material at two distinct points, creasing devices having movable members for finishing the creases after the blades have ceased to act on the material, and cams for operating the creasing devices.

42. The combination with a frame, of rockably-mounted members, means for rocking said members to crease the fabric between them, and means for moving said fabric into the space between said members prior to the rocking thereof.

43. The combination of a stationary member, a movable creaser-bar coacting therewith, a movable wall coacting with the creaser-bar, said parts serving to form two creases in a section of fabric, and means for operating said parts.

44. The combination of a stationary member, a movable creaser-bar coacting therewith, a movable wall coacting with the creaser-bar, said parts serving to form two creases in a section of fabric, means for operating said parts, and means for pressing the fabric between said parts prior to the creasing movement thereof.

45. The combination of a stationary member, a movable creaser-bar coacting therewith, a movable wall coacting with the creaser-bar, said parts serving to form two creases in a section of fabric, means for operating said parts, and two blades serving to press said fabric between said parts prior to the creasing action thereof.

46. The combination of a stationary member, a movable creaser-bar coacting therewith, a movable wall coacting with the creaser-bar, said parts serving to form two creases in a section of fabric, and means for operating said parts, such means comprising a cam bearing against one of the parts and means for mounting and operating the cam.

47. The combination with a frame, of a stationary member, a movable creaser-bar coacting therewith, a movable creaser-wall coacting with the bar, means for operating the bar and wall, a cross-head, a blade carried directly thereby, and a second blade yieldingly mounted on the cross-head, said blade coacting with the creaser bar and wall.

48. The combination with creasing devices, of a cross-head movable toward and from the same, a blade carried directly by the cross-head, and a second blade carried yieldingly thereby.

49. The combination with creasing devices, of a cross-head movable toward and from the same, a blade carried directly thereby, a second blade carried movably on the cross-head, a spring actuating the second blade, a spring actuating the cross-head, and means for operating the cross-head and the second-named blade successively.

50. The combination with means for holding shade material, of creasing devices having movable members, a cross-head movable toward and from the same, a folding-blade carried directly by said cross-head, a second blade adapted to act upon the material at a point distinct from the first-mentioned blade, a yielding connection between one of the blades and the cross-head whereby said blade and cross-head may move in unison or one blade permitted to move independently of the cross-head, means for operating the cross-head and blades so as to force the material between the creasing devices, and means for actuating the movable members of the creasing devices.

51. The combination with means for holding shade material, of creasing devices having movable members, a reciprocatory cross-head movable toward and from the same, a folding-blade carried directly by said cross-head, a second blade adapted to act upon the material at a point distinct from the first-mentioned blade, springs forming a yielding connection between one of the blades and the cross-head whereby said blade and cross-head may move in unison or one blade permitted to move independently of the cross-head, means for operating the cross-head and blades so as to give one blade a longer movement than the cross-head and to force the material between the creasing devices, and means for actuating the movable member of the creasing devices.

52. The combination with creasing devices, of a cross-head movable toward and from the same, a blade carried directly thereby, a second blade carried movably on the cross-head, a spring actuating the second blade, a spring actuating the cross-head, means for operating the cross-head and the second-named blade successively, said means for operating the cross-head and second blade comprising a treadle, an extensive connection between the treadle and cross-head, and a connection between the treadle and second blade, the latter connection permitting a certain independent movement of the treadle.

53. The combination with a frame, of a stationary member, a rocking creaser-bar coacting therewith, a swinging wall coacting with the creaser-bar, means for operating said bar and wall, a cross-head, a blade carried thereby, a rod in connection with the cross-head, a spring bearing between the cross-head and creaser-bar, a second spring bearing between the creaser-bar and frame, a second blade movably mounted on the cross-head, a spring acting between the second blade and cross-head, a rod in connection with the second blade, and means for successively moving the said rods.

54. The combination with a frame having means for carrying and operating on a shade fabric, of a guide, a bearing adjustable thereon, and serving to carry one end of the shade-roller, a second bearing adjustable on the guide, a head revolubly mounted in the bearing and capable of engaging the other end of the shade-roller, and means for revolving the head.

55. The combination with a frame having means for carrying and operating on a shade fabric, of a guide, a bearing adjustable thereon, and serving to carry one end of the shade-roller, a second bearing adjustable on the guide, a head revolubly mounted on the bearing and capable of engaging the other end of the shade-roller, means for revolving the head, said means comprising a revolubly-driven sleeve, and a shaft in connection with the head and slidably fitted in the sleeve, said sleeve and shaft being engaged to drive the one from the other.

56. The combination of a framing two cutting devices mounted at the sides of the framing respectively to trim the edges of a length of fabric, creasing means mounted on the framing to which the fabric is passed, as it moves from the cutting devices, and means for operating the cutting and creasing devices.

57. The combination of a framing, two cutting devices mounted at the sides of the framing respectively to trim the edges of a length of fabric, creasing means mounted on the framing to which the fabric is passed as it moves from the cutting devices, means for operating the cutting and creasing devices, and a strip or bar extending transversely of the framing between the cutting and creasing devices and adapted to have a knife run over it to sever the fabric into lengths.

58. The combination of a framing, a transverse guide thereon, a bracket adjustably mounted on the guide, two coacting rotary cutters carried by the bracket, two shafts on which said cutters are respectively splined, and means for driving the shafts.

In testimony whereof I have signed my name to this specification in the presence of two subscribing witnesses.

EPHRAIM O. ENGBERG.

Witnesses:

M. TURNER,

ADLERT WELDON.